United States Patent [19]

Hutchings et al.

[11] Patent Number: 5,243,015
[45] Date of Patent: Sep. 7, 1993

[54] LATENT CATALYZED PHENOLIC RESOLE RESIN COMPOSITION

[75] Inventors: David A. Hutchings, Tucker; Ted M. McVay, Stone Mountain; Richard F. Pennock, Decatur, all of Ga.

[73] Assignee: Georgia-Pacific Resins, Inc., Decatur, Ga.

[21] Appl. No.: 903,228

[22] Filed: Jun. 25, 1992

[51] Int. Cl.$^5$ ............... C08G 8/04; C08G 14/00; C08L 61/00

[52] U.S. Cl. ............... 528/129; 528/137; 528/141; 528/143; 528/144; 528/145; 528/154; 528/165; 528/230; 525/509; 525/518; 525/519; 524/593; 524/594; 524/595

[58] Field of Search ............... 528/129, 139, 143, 165, 528/154, 230, 144, 145, 141; 525/509, 518, 519; 524/595, 594, 593

[56] References Cited

U.S. PATENT DOCUMENTS

| | | |
|---|---|---|
| 2,234,548 | 3/1941 | Brannon . |
| 2,934,511 | 4/1960 | Auerbach et al. . |
| 3,471,443 | 10/1969 | Bornstein . |
| 3,485,797 | 12/1969 | Robins ............... 528/153 |
| 3,666,721 | 5/1972 | Godfrey . |
| 3,678,103 | 7/1972 | Huck . |
| 3,785,997 | 1/1974 | Godfrey . |
| 3,843,575 | 10/1974 | Dijkstra . |
| 3,915,905 | 10/1975 | Hanton . |
| 4,101,459 | 7/1978 | Andrews . |
| 4,101,500 | 7/1978 | Brodsky ............... 528/163 |
| 4,252,938 | 2/1981 | Valgin et al. . |
| 4,277,383 | 7/1981 | Hayashi et al. . |
| 4,307,208 | 12/1981 | Chattha . |
| 4,323,660 | 4/1982 | Chattha . |
| 4,555,544 | 11/1985 | Meyers ............... 524/595 |
| 4,656,239 | 4/1987 | Waitkus et al. . |
| 4,675,375 | 6/1987 | Kempter et al. ............... 528/142 |
| 4,747,968 | 5/1988 | Gilleo . |
| 4,894,431 | 1/1990 | Armbruster et al. . |
| 4,897,170 | 1/1990 | Chandramouli ............... 524/49 |
| 4,904,753 | 2/1990 | Watts et al. . |
| 4,925,887 | 5/1990 | Günther et al. ............... 528/142 |
| 4,942,217 | 7/1990 | Gardziella et al. . |
| 4,968,772 | 11/1990 | Whiteside ............... 528/230 |
| 4,977,231 | 12/1990 | McVay et al. ............... 528/142 |
| 4,987,198 | 1/1991 | Izukawa et al. ............... 528/142 |
| 5,025,085 | 6/1991 | Piedrahita et al. ............... 528/230 |
| 5,079,315 | 1/1992 | Demarey ............... 528/230 |
| 5,087,690 | 2/1992 | Demarey ............... 528/230 |
| 5,110,899 | 5/1992 | Sakata et al. ............... 528/230 |
| 5,115,083 | 5/1992 | Piedrahita et al. ............... 528/230 |

OTHER PUBLICATIONS

Endo, Takeshi, 1988, "Synthesis of Monomers Having Nonshrinking Properties During Polymerization", Toso Kogaku, 23(2):72-9 (Abstr. Only).

Endo, et al, 1989, "Syntheses of Functional Polymers Based on Spirocyclic Compounds. Monomers and Polymers That Undergo Polymerization and Curing Without Shrinkage in Volume", Sekiyu Gakkaishi, 32(5): 237-47 (Abstr. Only).

Endo, Takeshi, 1989, "Design of Functional Polymers and Fine Chemicals", Shikizai Kyokaishi, 62(6):360-8 (Abstr. Only).

Fukuoka, et al, 1989, "Microcapsulated Latent Hardener 'Novacure' For One-Part Epoxy System" II, Kotingu Jiho, (184):9-17 (Abstr. Only).

Takata, et al., 1990, "Latent Acid Catalysts. Benzyl Pyridinium and Sulfonium Salts", Yuki Gosei Kagaku Kyokaishi, 48(11):978-9 (Abstr. Only).

Pizzi, et al., 1986, "Self-neutralizing Acid-Set PF Wood Adhesives", Holz Roh-Werkst., vol. 44, No. 6:229-34.

*Primary Examiner*—John Kight, III
*Assistant Examiner*—P. Hampton-Hightower
*Attorney, Agent, or Firm*—Banner, Birch, McKie, & Beckett

[57] ABSTRACT

A latent catalyzed phenolic resin composition is provided containing a thermosetting phenolic resole resin and a latent catalyst consisting essentially of a primary or secondary amine salt of a strong acid.

34 Claims, 1 Drawing Sheet

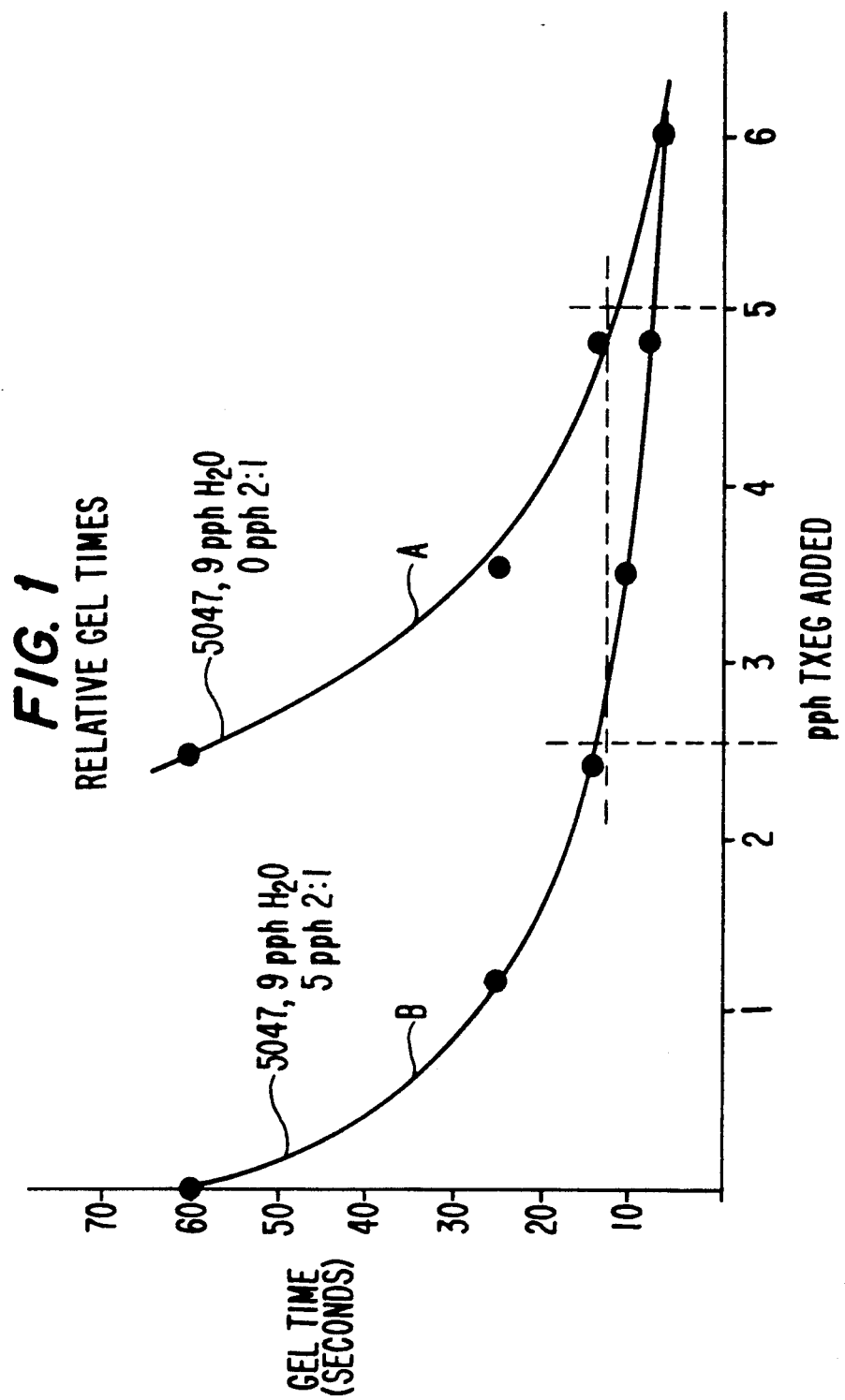

5,243,015

LATENT CATALYZED PHENOLIC RESOLE RESIN COMPOSITION

BACKGROUND OF THE INVENTION

1. Field of the Invention

The present invention relates to phenolic resin compositions and more particularly to a latent catalyst system for use with a phenolic resole resin which imparts improved storage stability (longer pot life) to the resole resin composition while the resin retains rapid cure characteristics at use conditions.

2. Related Art

Phenolic A-stage resins are well known to be prepared from a phenolic component and an aldehyde component which are catalytically reacted. A variety of ionizable catalytic agents are known in the art for the preparation of resole resins, including various alkali metal compounds, alkaline earth metal compounds, and amines. Residual ionizable catalyst permits subsequent heat cure of the resole resins, though at the expense of storage stability. One class of resole resins are benzylic ether resins formed by the reaction of a phenol and an aldehyde under substantially anhydrous conditions at temperatures generally below about 130° C., in the presence of a catalytic concentration of a metal ion dissolved in the reaction medium. Such metal ion catalytic agents include sodium and zinc acetate, lead acetate, lithium naphthanate, lead naphthanate, lead oxide, and the like. Resole resins also can be formed using alkaline catalysts, such as the alkali metal and the alkaline earth metal hydroxides, which the art has used in forming aqueous resoles, by the aqueous reaction of a phenol and formaldehyde at a moderate temperature, subsequently neutralizing the reaction medium to a pH of about 3.8–5.3 to form insoluble, non-ionizable salts, and then stripping water, to the extent desired, from the reaction medium under vacuum at temperatures ranging up to 130° C. The insoluble, non-ionizable salts may be removed by filtration or other common means prior to dehydration in order to lower the residual ionizability even more.

The preparation and characterization of some of these resins is disclosed in greater detail in U.S. Pat. No. 3,485,797. The resole resins formed in the this reference also are known as high ortho-ortho resins in that the resins are characterized by ortho-ortho linkages, compared to conventional resole resins, whether formed under anhydrous conditions or not, wherein ortho-para linkages predominate.

Phenolic resole resins can be converted to a cured network (C-stage) in the presence of hydrogen ion-type catalysts, such as typified by strong inorganic and organic acids. Though such resole resins can be cured readily in the presence of strong acid catalysts, the pot life of such acid catalyzed compositions (i.e., the time until the composition is no longer useful in a particular application), suffers from the presence of such strong acid catalysts. Thus, there is a need in the phenolic resole art for improving their pot life or storage stability, while maintaining, and even increasing the speed of cure of acid-catalyzed resole resins. In this way, the cure speed and pot life performance of phenolic resole resin compositions can match those now available from vinyl esters and polyesters, and phenolic resole resins may become a viable alternative in many applications.

BRIEF DESCRIPTION OF THE DRAWING

FIG. 1 is a graph showing the gel time in seconds as a function of added strong acid for a phenolic resin with and without added latent catalyst.

DESCRIPTION OF THE INVENTION

The present invention is directed to latent catalyzed phenolic resole resin compositions which exhibit cure characteristics comparable to conventional strong acid catalyzed resole resins, but which exhibit extended storage stability characteristics (longer pot life) in the presence of the latent catalyst relative to the conventional acid-catalyzed resole resin compositions.

In particular, the present invention is directed to a latent catalyzed phenolic resin composition containing a thermosettable phenolic resole resin and a latent catalyst consisting essentially of an amine salt of a strong acid. The latent catalyst is provided in the composition in an amount adequate to cure said resole resin upon the application of heat at a rate comparable to the cure rate of conventional strong acid catalyzed resole resins under comparable cure conditions. In an alternate embodiment, the composition also includes, as an additional ingredient, some strong acid catalyst typically in an amount which is insufficient by itself to cure the resole resin at a commercially useful rate. Use of this lower amount of additional strong acid catalyst permits the composition to retain the extended pot life benefits associated with the latent catalyst, but allows the strong acid to act synergistically in combination with the latent catalyst to accelerate the cure rate of the resole resin dramatically.

The present invention also is directed to methods for using the latent catalyzed resole resin composition, and to resole resin compositions particularly adapted for such methods of use.

The storage stability or pot (shelf) life of the latent catalyzed resole resin composition of the present invention is greater than that of a resole resin composition containing only a strong acid catalyst in an amount adapted to provide a resole resin composition of equivalent cure characteristics under comparable cure conditions to the latent catalyzed composition of the present invention.

The prior art identifies a variety of strong acids as conventional catalysts for curing phenolic resole resins. These catalysts include, for example, mineral acids including sulfuric acid and phosphoric acid, halogen acids such as hydrochloric acid, sulfonic acids such as paratoluene sulfonic acid; and other organic acids including chlorinated acetic acids, oxalic acid and maleic acid. Typical acid concentrations for catalyzing resole resins have ranged in the past from about 2 to 20 weight percent (active acid basis). It also is known that certain ammonium salts of these acids, which produce the acid upon heating, also can be used, e.g., ammonium sulfate and ammonium chloride. While such ammonium salts generally provide compositions of adequate storage stability or pot life, quite high temperatures normally are needed to obtain an adequate rate of cure.

While use of the strong acid catalysts yields rapidly curing phenolic resole resin compositions, the storage stability or pot life of such compositions are very poor. Consequently, phenolic resole resin compositions have not been considered suitable as a low cost, direct replacement for commonly used resin compositions such as styrene-polyester-based resin systems presently used in sheet molding compound and filament winding applications of the prior art. The present invention, in contrast, provides a low cost phenolic resole resin composition that addresses the storage stability or pot life deficiency of the prior art strong acid catalyzed phenolic resole resin compositions, and thus opens up these applications to the use of phenolic resole resins. The compositions of the present invention are able to remedy this deficiency without sacrificing cure rate characteristics.

In accordance with the present invention, at least a major portion, and in many cases the entire amount, of such conventional strong acid catalyst in prior art resole resin compositions is replaced with a latent catalyst system consisting essentially of an amine salt of a strong acid. In the broad practice of the present invention the latent catalyst is added to the resole resin composition in an amount of between about 1 and 25% by weight of resole resin solids. Most often, an amount of latent catalyst between about and 2-20% by weight is used.

Strong acids for preparing the latent catalyst of the present invention include sulfonic acids such as paratoluene sulfonic acid (PTSA), xylene sulfonic acid, phenol sulfonic acid and especially methane sulfonic acid (MSA), mineral acids, particularly sulfuric acid and phosphoric acid, hydrochloric acid, perchloric acid and strong organic acids such as oxalic acid, maleic acid, chloroacetic acid and trifluroacetic acid. It is preferred to use an acid having a pKa measured in an aqueous environment of less than about 4.0. The sulfonic acids are particularly preferred.

To prepare the latent catalyst, the strong acid is reacted with an amine to from the corresponding salt. Amines for preparing the latent catalyst have a formula R-NH$_2$ or R—NH—R, which are referred to herein as primary and secondary amines, respectively. The R substituents of the primary and secondary amines can be the same or different and can independently constitute any radical that does not interfere with the formation of the amine salt or the subsequent use of the salt as a latent catalyst, and may include additional primary (—NH$_2$), secondary (—NH—) amino or tertiary

moieties.

Normally, the R substituent will be selected from hydrocarbon moieties such as alkyl groups, generally a lower alkyl (linear or branched) of 1 to 8 carbon atoms, alkenyl groups, generally of 2 to 8 carbon atoms, alkynyl groups, generally of 2 to 6 carbon atoms, cycloalkyl and cycloalkenyl groups, generally of 4 to 8 carbon atoms, aryl groups, generally phenyl or naphthyl, aralkyl and aralkenyl groups generally of 7 to 16 carbon atoms, and alkenaryl and alkaryl groups, also generally having 7 to 16 carbon atoms, all of which can optionally be substituted with any moiety that does not interfere with amine salt formation and the subsequent use of the salt as a latent catalyst. In the case of secondary amines (i.e., R—NH—R), the two R substituents also can be linked together to form a saturated or unsaturated 5 to 9 member (atom) cyclic or ring structure. Normally, the ring can contain up to 3 nitrogen atoms and up to 6 carbon atoms. Examples of such ring structures include morpholino, pyrrolidino, piperidino, and the like.

Examples of specific R groups include methyl, ethyl, n-propyl, isopropyl, n-butyl, isobutyl, t-butyl, n-pentyl, isopentyl, n-hexyl, n-octyl, phenyl, benzyl, and the like.

Specific examples of suitable amines include primary (N-substituted) and secondary (N,N-disubstituted) aliphatic, alicyclic, aromatic and heterocyclic amines and combinations thereof. Representative primary (N-substituted) and secondary (N,N-disubstituted) aliphatic amines include the N-alkyl amines such as methyl, ethyl, propyl and butyl amines, the N-alkylene diamines such as ethylene diamine, propylene diamine and butylene diamine, N,N-dialkylene triamines such as diethylene triamine, the N,N-dialkyl amines such as N,N-dimethyl and N,N-diethyl amine, N,N-dialkenyl amines such as N,N-diethyleneamine, N-alkyl diamines such as 1,3-diaminopropane, and 1,2-diaminopropane, N-alkanolamines such as ethanolamine, N-alicyclic amines such as 1,2-diaminocyclohexane and N-cyclohexylamine, N-aryl and N,N-aryl amines such as aniline, N-methylaniline and N-benzyl amine, and heterocyclic amines such as melamine, pyrrole, pyrolidine and piperidine. Amines containing at least one primary amine (—NH$_2$) group generally are preferred.

The latent catalyst is prepared simply by mixing the strong acid with the primary or secondary amine under amine salt-forming conditions. Suitable conditions are well-known to those skilled in the art. The strong acid preferably should be added to the amine in an amount sufficient to provide a stoichiometry of at least one mole of acid moiety per each mole of amine moiety. In an alternative embodiment, the strong acid can be used in more than this 1:1 stoichiometric ratio, i.e., in a stoichiometric excess relative to the moles of amine moieties. The excess of acid is insufficient for the free acid, by itself, to cure the resole rapidly, but the excess acid acts synergistically with the acid-amine salt to promote rapid cure of the resole under use conditions.

Referring now to resole resins for preparing the composition of the present invention, essentially any resole resin used in or equivalent to prior art acid-catalyzed resole resin compositions also can be used to prepare resole resin compositions according to the present invention. It will be appreciated that resole resins commonly used in many acid-catalyzed systems generally are low in water content, i.e., contain less than about 10-20% by weight water, and usually less than 10% by weight, as is standard in resole preparation chemistry for low formaldehyde to phenol mole ratios formaldehyde:phenol ranging from 1.0:1 to 1.6:1. However, in other applications, such as in filament winding, the resole may be used at higher water levels containing up to about 20% water.

The phenol component employed in the formation of suitable phenolic resole resins generally include any phenol which has heretofore been employed in the formation of phenolic resins and which are not substituted at either the two ortho positions or at one ortho and the para position, such unsubstituted positions being necessary for the desired polymerization reaction to occur. Phenols substituted in these positions may be used in lesser quantities (e.g., up to about 30 weight % of the phenol component) as is known in the art to control molecular weight by a chain termination reaction. Any one, all, or none of the remaining carbon atoms of the phenol ring can be substituted in a conventional fashion. The nature of these substituents can vary widely, and it is only necessary that the substituent not interfere in the polymerization of the aldehyde with the phenol at the ortho and/or para positions thereof (except for molecular weight control as noted above).

Furthermore, at least a portion of the phenol component must include a phenol not blocked at the ortho and para positions so that the resin is thermosettable. Preferably, at least 10% by weight of the phenol component should include such tri-functional phenol and usually the phenol component consists essentially entirely of such tri-functional phenol.

Substituted phenols employed in the formation of the phenolic resins include alkyl substituted phenols, aryl substituted phenols, cycloalkyl substituted phenols, alkenyl-substituted phenols, alkoxy substituted phenols, aryloxy substituted phenols, and halogen-substituted phenols, the foregoing substituents possibly containing from 1 to 26, and preferably from 1 to 9, carbon atoms.

Specific examples of suitable phenols for preparing the resole resin composition of the present invention include: phenol, o-cresole, m-cresole, p-cresole, 3,5-xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Ordinary phenol normally is preferred for most applications.

The phenol component can also include a small amount of di-functional phenol such as resorcinol.

The aldehyde component reacted with the phenol component similarly can include any of the aldehydes or their equivalents heretofore employed in the formation of phenolic resole resins including, for example, formaldehyde, acetaldehyde, propionaldehyde, furfuraldehyde, and benzaldehyde. In general, the aldehydes employed have the formula R'CHO wherein R' is a hydrogen or hydrocarbon radical generally of 1-8 carbon atoms. It will be appreciated that some aldehydes, e.g., acetaldehyde and butaraldehyde, improve toughness of the resole resin at the expense of lowering the HDT thereof (heat distortion temperatures, as determined by American Society for Testing and Materials ASTM D-648). Also, it is contemplated that difunctional aldehydes can be used to prepare the phenolic resin, and could advantageously be used to introduce cross-links into the cured resin. Again, ordinary formaldehyde is preferred for most applications. Formaldehyde can be supplied in any one of its commonly available forms including formalin solutions and paraformaldehyde.

The phenolic resole resin can be prepared by reacting the phenol component and aldehyde component at a desired aldehyde to phenol mole ratio in the presence of a resole-forming catalyst. Generally, the aldehyde and phenol components are reacted under alkaline resole resin forming conditions. Alkaline resole resin forming conditions can be established by adding a suitable alkaline material to the conventional aqueous reaction medium. As is well known, the alkaline material can comprise, among other known materials, amines, alkali metal hydroxides, alkaline earth metal hydroxides and alkali metal carbonates. Sodium hydroxide is commonly employed. The aldehyde and phenol reactants are reacted at an aldehyde to phenol mole ratio broadly within the range of 0.85:1 to 3.5:1 and more preferably at a mole ratio within the range of 1:1 to 1.75:1. The resole resin also can constitute a blend of resins prepared at different aldehyde to phenol mole ratios. For example, a blend of a resin made at a low aldehyde to phenol mole ratio with a resin made of a high aldehyde to phenol mole ratio may be advantageous in some applications. In fact, the present invention contemplates the preparation of a heat and acid curable blend of a resole resin and a novolak resin as the thermosetting resin composition. The addition of the novolak resin can increase the strength and toughness of the cured resin and improve surface quality. As is well known, the resole can be prepared by staged or gradual addition of the aldehyde component to the phenol and/or by gradual addition of the alkaline material to promote a controlled polymerization.

It also is contemplated that the phenolic resole resin can be prepared in the presence of other resin modifier monomers such as urea, melamine and furan. It is intended that such modified phenolic resins be included in the thermosetting phenolic resole resin compositions of the present invention.

After preparing the resole resin and prior to the addition of the latent catalyst in accordance with the present invention, it is desirable to preneutralize the resin with a strong acid to lower the resole resin's pH to between about 4.5 and 7, generally to between about 6 and 7.

A variety of other modifiers also can be cooked into the resole resin in order to improve toughness and other cured resin properties. These modifiers include, for example, chain terminating phenols, glycols, with or without halogen substitution for additional fire retardancy, polyester polyols, alkyl phenols, hydroxy-containing acrylates, and the like and mixtures thereof. The proportion of such modifies incorporated into the resole resin typically ranges from about 5 to 35 weight percent (based upon the phenol component).

Finally, it will be appreciated that a variety of modifiers can be included according to the demands of particular applications in the ultimate resole resin composition, e.g., added to the resole resin after its preparation, such as fire retardant modifiers typified by phosphate esters and halogenated phenols. Additional modifiers include fillers, though such fillers preferably should be restricted to neutral and/or acidic fillers in order that additional latent catalyst or acid catalyst is not spent on neutralization of basic fillers incorporated in the formulation. Reactive modifiers also can be added to the resole resin after it has been formulated. These reactive modifiers include, for example, di- and higher polyols, e.g., di- or polyhydric phenols, resorcinol, phloroglucinol, and the like. Finally, modifiers to achieve special effects in particular applications may be appropriate, e.g., polyvinyl butyrals, or epoxies for better impact strength in composites.

A final general component which may be used in resole resin compositions of the present inventions is a solvent. A variety of solvents can be used in diluting the phenolic resole resin composition to a desired solids concentration or viscosity for certain applications. These solvents include water or a variety of non-aqueous solvent such as aromatic solvents including benzene, toluene, xylene, ethyl benzene, and the like. Additional non-aqueous solvents include polar solvents such as furfural, furfuryl alcohol (which co-reacts under acid conditions) various Cellsolves, carbitols, ketones, and various alcohols such as ethylene glycol, benzyl alcohol and the like.

The latent catalyst-containing resole resin composition of the present invention can be used in a wide variety of applications including inter alia as a laminating resin for fiberglass reinforcement, as a binder resin for molded articles, as a filament winding resin, as a pultrusion resin for preparing fiberglass reinforced articles, as a binder resin in reaction injection molded (RIM) articles reinforced with fiberglass or other materials, as a resin for resin transfer molding (RTM) and the like.

One key application for latent catalyzed phenolic resole resin compositions of the present invention is in the preparation of a phenolic molding compound (PMC). In this application, the phenolic resole resin composition containing the acid-amine salt latent catalyst is mixed with a clay filler and with chopped, reinforcing glass fibers to produce a putty-like molding compound. Addition of ethylene glycol to the PMC, generally in an amount of between 5 and 20% by weight of the phenolic resin has been observed to increase its shelf life significantly. The PMC composition can be blended on a machine and placed between two release films to create a sheet of material of uniform thickness. Such sheets can be cut into reproducible portions of the molding compound for match-dye molding applications. PMC compositions of the present invention have exhibited shelf storage stability of two months or longer at room temperature. The PMC composition also is capable of curing into a finished (molded) part of one-eighth inch in thickness in molds having a surface temperature on the order of 140°–150° C. in about 90 seconds.

In such applications, it is preferred to use a clay filler, particularly a kaolin-type clay such as Englehard ASP-400P. The clay appears to play a role in prolonging the shelf stability of the phenolic molding compound. While phenolic molding compound compositions containing such clay filler show pot lives of greater than one month at room temperature, aqueous slurries containing only the resole resin and the acid-amine salt latent catalyst have been observed to harden in about a week's time. Consequently, although the inventors do not wish to be bound to any particular theory, it appears that the clay filler acts as a buffer in the phenolic molding compound to extend its pot life (shelf stability).

Phenolic molding compound compositions also have been formulated containing an alkali metal salt of a strong acid such as zinc chloride. Although not completely understood, the salt, such as zinc chloride, in particular, may augment curing of the phenolic molding compound composition, although there also is evidence that the addition of zinc chloride may tend to shorten shelf life of the phenolic molding compound composition.

Another prevalent use for phenolic resole resin compositions of the present invention is in filament winding applications. Uncatalyzed resole resin compositions suitable for filament winding are low viscosity resins, (e.g., a viscosity in the range of 800 to 3500 cps). which can contain 5-20% by weight water. In this particular application, it is preferred to augment the latent catalyst in the phenolic resole resin composition by addition of a strong acid catalyst. The strong acid catalyst is added to the resole resin composition in an amount below that normally required to cure the resin by itself. Normally, the additional strong acid is added in an amount of about 1 to 10% by weight of the resole resin solids. The added acid enhances the cure rate of the phenolic resole resin composition substantially without significantly affecting resin stability (pot life).

The following examples are given as specific illustrations of the present invention, and not for the purpose of limiting the invention. Reference should be made to the appended claims to determine the invention's scope.

EXAMPLE 1

The phenolic resole resin used in this example for preparing a phenolic sheet molding compound was prepared by reaction of phenol and formaldehyde (about 50 percent aqueous formaldehyde solution) in a F:P molar ratio of 1.4:1.

The monomers were reacted in the presence of a Group II metal hydroxide catalyst to produce, upon neutralization of the catalyst and distillation of the water, a resole resin having the following properties:

18% free phenol
0.5% free formaldehyde
7.5% water
pH of 6.5
Viscosity of 600 cps
Refractive Index of 1.5676
75% solids (on curing)

To a Hobart mixer (high torque puddle-type mixer) were added 330 grams of kaolin clay, and a mixture of 270 grams of the above-prepared liquid phenolic resin, and 60 grams of a latent catalyst system comprising an aqueous solution containing 26 weight percent zinc chloride and about 24 weight percent of an ethylene diamine (EDA) salt of methane sulfonic acid (MSA) (mole ratio of EDA:MSA of 1:2). The latent catalyst was prepared by dissolving the zinc chloride in water, slowly adding ethylenediamine to the zinc chloride solution over a 30-minute period, taking care that the temperature does not exceed 90° C., then adding methane sulfonic acid (as a 70% aqueous solution) over 30 minutes, again keeping the temperature below 90° C. The solution was cooled and diluted with additional water.

The clay filler, resin, and catalyst were mixed to produce a highly viscous fluid. At this point, 250 grams of ¾" chopped strand glass reinforcement was added to the fluid mass. The glass fibers were worked into the system by hand with sufficient kneading to allow wet-out of the glass. The molding compound was then placed between two sheets of polyethylene film and subjected to pressing to produce a sheet of molding compound 3/16 to ¼" thick. On standing, the molding compound thickened to a point where easy removal of the plastic cover sheets was possible.

Samples of the molding compound were then press molded in a picture frame arrangement (this involves a placement of a molding compound sample into a 6"×6"×⅛" square retaining frame such that the molding compound filled the frame to form a ⅛" plaque on press compress/cure) to produce a flat plaque.

Molding conditions:
The flat plaques were molded at a press temperature of 130° C., a press pressure of 180 psi and for a press time of 3 minutes.

Test bars were cut from the molded plaques and tested for tensile performance using an Instron tensile tester. Tests results showed a tensile strength of 9000 psi.

A control phenolic sheet molding compound (SMC) composition was produced in which the catalyst system was omitted from the formulation. Samples of SMC produced did not cure in press times up to 20 minutes at the 130° C. molding temperature. When higher (200° C.) press temperatures were used, SMC gelling was observed, but volatiles produced by resin decomposition and water volatilization gave a commercially useless, highly foamed molded product. This shows that an uncatalyzed thermosetting phenolic SMC cannot perform in the desired fashion typified by the latent catalyst system.

COMPARATIVE EXAMPLE 1

The PMC prepared and molded in accordance with Example 1 was tested for a variety of physical properties for comparison with a commercially available polyester molding compound LPMC available from Total Composites, Inc. The phenolic and polyester molded samples were tested in accordance with ASTM D-638 for their tensile properties, in accordance with ASTM D-790 for their flexural properties and in accordance with ASTM-695 for their compressive strength. The tensile test was performed using Type 1 specimens at a 0.2 inch/min (0.5 cm/min) crosshead speed. Flexural properties were obtained at a crosshead speed of 0.05 inch/min. (0.13 cm/min). Compressive strengths were measured at a crosshead speed of 0.05 inch/min (0.13 cm/min) using dogbone shaped specimens with a supporting jig. The results reported in Table 1 below are an average of five replicates, except in the case of compressive strength where only three specimens were tested.

TABLE 1

|  | Phenolic | Polyester |
|---|---|---|
| Tensile Strength | 10,900 psi (75.2 MPa) | 12,700 psi (87.6 MPa) |
| Tensile Modulus | $1.5 \times 10^6$ psi (10.3 GPa) | $1.9 \times 10^6$ psi (13.1 GPa) |
| Flexural Strength | 22,500 psi (155 MPa) | 25,800 psi (178 MPa) |
| Flexural Modulus | $1.2 \times 10^6$ psi (8.3 GPa) | $1.4 \times 10^6$ psi (9.6 GPa) |
| Compression Strength | 13,000 psi (90 MPa) | 14,600 psi (101 MPa) |

The physical properties of the molded phenolic are comparable to those of the polyester.

EXAMPLES 2-17

Several amine salts were prepared by reacting certain amines with either methane sulfonic acid or toluene sulfonic acid. In the case of diamine salts, 0.01 mole of the diamine was dissolved in 20 grams of isopropyl alcohol and 0.02 mole of 70% methane sulfonic acid was dissolved in a second quantity of isopropyl alcohol. The acid-alcohol solution then was slowly added to the amine solution with agitation. The amine salt precipitated and was filtered through a Büchner funnel. The resulting amine salt was washed with 5 to 10 ml aliquots of isopropyl alcohol followed by drying on the funnel. Finally, the precipitated salt was vacuum dried to obtain the pure salt.

In the case of preparing monoamine salts, 0.02 mole of methane sulfonic acid was slurried with 20 grams of hexane; while 0.021 mole of the primary amine was dissolved in 20 grams of hexane. The amine solution then was added to the hexanemethane sulfonic acid slurry with strong agitation. The amine salt formed immediately and on continued mixing crystallized from the hexane. Again, the reaction slurry was filtered through a Büchner funnel. The recovered amine salt then was heated with 40 grams of hexane to purify the salt further. After cooling, the salt was filtered. In order to obtain pure salt, it was important that the salt-forming reaction be conducted with a slight molar excess of the amine relative to the number of primary and secondary amine moieties since all amines used are soluble in the hexane solvent. As above, the resulting salt was dried on the funnel and then further vacuum dried to produce the pure salt.

Various amine salts prepared in the previous manner were tested for their cure accelerating effect using a phenolic molding compound resin. Samples were prepared as follows:

A quantity of each amine salt was selected containing an amount of combined methane sulfonic acid (MSA) equivalent to that contained in one gram of the 2:1 stoichiometry methane sulfonic acid-ethylenediamine mixture. The selected amount of amine salt catalyst is mixed with 10 grams of the phenolic molding compound (PMC) resin of Example 1 to provide samples for stroke cure testing. It has been shown that performance in this simple stroke cure test correlates well with phenolic molding compound performance determined on catalyst-resin samples to which have been added clay filler and glass reinforcement; i.e., rapid cure in the stroke cure test indicates that rapid cure will take place in their corresponding PMC systems.

The PMC resin containing the latent catalyst then was evaluated for its Stroke cure using a 100° C. constant temperature hot plate. The stroke cure has two end points. The first is identified as the time after initiating heating when strings or fibers of the curing resin form during the stroking of the resin. The second occurs when such fibers no longer form.

According to the stroke cure method, a drop of the PMC resin-catalyst mixture (about 0.2 g) was placed directly onto the hot plate's surface. The drop was worked into a thin film using a metal spatula in a circulatory motion. A stopwatch was started at the point the drop initially was flattened and the spatula was constantly raised to assess the resin condition during cure. As the resin cures, its viscosity increases to a point where elastic fibers (strings) start to form as the spatula is raised. As noted above, this time is noted as the appearance of strings time. The elapsed time is noted as the lower end of the Stroke cure time. Eventually, the system gels and the strings break and cannot reform. At such time, the stopwatch was stopped and the time recorded as the upper end of Stroke cure time. The time to disappearance of the strings is considered to be the Stroke cure end point.

Table 2 below reports a series of Stroke cure experiments using a variety of amine salts in the above-described PMC resin.

TABLE 2

| Example | Amine | Acid[2] | Grams Latent Catalyst per 10 grams of Resin | Stroke Cure[1] (sec) |
|---|---|---|---|---|
| 2 | Ethylene diamine | MSA(2)[3] | 1.0 | 14–18 |
| 3 | piperazine | MSA(2) | 1.1 | 36–70 |
| 4 | 1,3-diaminopropane | MSA(2) | 1.06 | 14–17 |
| 5 | 1,2-diaminocyclohexne | MSA(2) | 1.2 | 16–23 |
| 6 | N,N,N',N'-tetramethylethylene diamine | MSA(2) | 1.22 | >240 |
| 7 | 1,4-dimethylpiperazine | MSA(2) | 1.21 | >240 |
| 8 | 1,2-diaminopropane | MSA(2) | 1.06 | 13–17 |
| 9 | diethylenetriamine | MSA(3) | 1.04 | 6–7 |
| 10 | tert-butylamine | MSA(1) | 1.34 | 16–23 |
| 11 | cyclohexyl amine | MSA(1) | 1.55 | 13–17 |
| 12 | butyl amine | MSA(1) | 1.34 | 18–25 |
| 13 | propyl amine | MSA(1) | 1.23 | 9–12 |
| 14 | AEPP[4] | MSA(1) | 1.59 | 11–13 |
| 15 | ethylene diamine | PTSA(1) | 1.75 | 11–15 |
| 16 | diethylene triamine | PTSA(3) | 2.67 | 6–8 |

TABLE 2-continued

| Example | Amine | Acid[2] | Grams Latent Catalyst per 10 grams of Resin | Stroke Cure[1] (sec) |
|---|---|---|---|---|
| 17 | diethylene triamine | PTSA(2) | 1.91 | >240 |

[1]The lower number is the elapsed time to initial string formation and the upper limit is the elapsed time to the disappearance of strings (gelation).
[2]MSA = methane sulfonic acid, PTSA = para-toluene sulfonic acid.
[3]The number in parenthesis (n) refers to the moles of acid reacted with one mole of amine.
[4]AEPP = 2-amino-2-ethyl-1, 3-propanediol

EXAMPLES 18-35

A variety of primary, secondary and tertiary amines were used to prepare a series of latent amine salt catalysts by combining them with stoichiometric equivalents of either methane sulfonic acid (MSA) or toluene sulfonic acid (TSA). The resultant salts were used to prepare latent-strong acid combination catalysts which were tested with a phenolic resole resin to determine their relative stroke cure rate and pot life performances. The stroke cure rate and pot life performance as measured by their $T_{50}$ (time to achieve 50° C. in an insulated catalyzed resin sample of two ounces) values are recorded in Table 3 for each resin-catalyst combination.

In these tests, an aqueous catalyst solution (water + amine sale + free MSA) in a 10 gram amount was prepared from each experimental catalyst. A quantity, 1.86 grams, of free acid (MSA) is present in each 10 gram sample while the mass of the acid-amine salt (latent catalyst component) was varied for each catalyst sample to provide a theoretical MSA-release potential of 1.86 grams from the latent catalyst amine salt. Each latent/strong acid catalyst combination was tested as a catalyst for polymerization of a standard G-P commercial resin (GP 5111). In each experiment, 7 grams of the amine salt/free MSA solution was added to equal amounts (50 grams) of a phenolic resole resin (GP 5111) commercially available from Georgia Pacific Resin, Inc. The catalyst solution was mixed thoroughly with the resin. A small resin/catalyst sample (2–4 grams) was withdrawn from each sample to perform a stroke cure test, while the remainder contained in a two ounce bottle was placed into an insulated foam chamber and monitored for its change in temperature due to any reaction exotherm.

The data for stroke cure and times for the insulated approximately 50 grams catalyzed resin samples to achieve a specific exotherm temperature are recorded in Table 3 for each MSA-latent catalyst combination. It will be noted that $T_{50}$ is the time from the start of the experiment for the insulated sample temperature to reach 50° C. The shorter the time for a sample to reach 50° C., the shorter is the resin-catalyst system pot life.

Table 4 relates stroke cure and pot life ($T_{50}$) for a range of MSA catalyzed resin systems. With these data, a base line is established giving expected pot life at any stroke cure time for all compositions of the strong acid catalyzed standard resin system. Thus, pot lives for the experimental combination catalyst system can be compared with MSA (strong acid) catalyzed systems having comparable stroke cures (elevated temperature cures). The result of such a comparison is reported in Table 5.

The effect of acid-amine based latent catalysts studied on phenolic resole pot life extension is presented in Table 5. The quotient of the $T_{50}$ for latent catalyst plus free MSA and the $T_{50}$ value for the straight acid catalyzed system having the same stroke cure (from Table 4) is reported in the last column of Table 5. For example, in Example 32 Table 5, when the straight MSA catalyzed system has a composition (acid level) which exhibits a stroke cure of 10 seconds, its pot life as indicated by its $T_{50}$ is 17 minutes. The latent catalyst based on 2-amino-2 ethyl-1,3-propanediol (Example 14 amine salt) has an equivalent stroke cure (10 seconds) but a $T_{50}$ of 29 minutes. The ratio of the $T_{50}$ of the amine salt plus MSA catalyst to the $T_{50}$ for the straight MSA catalyzed system is 1.71 indicating that the latent catalyst-based system can provide almost twice the pot life (i.e. about a 71% longer) than straight MSA can at a given stroke cure (90° C. cure rate). The preferred amine salts are those having a high quotient in Table 5 and a low stroke cure.

The Tables 3, 4 and 5 data also show that not all amines are effective in the form of their acid salts as pot life extenders. In fact, the tertiary amines appear to slow down the system, actually inhibiting the stroke cure time (19 seconds for N,N'-dimethylpiperizine and 29 seconds for N,N,N',N'-tetramethylethylene diamine) and produce half the pot life that would be expected if straight MSA was used.

TABLE 3

| Example | Amine Acid Salt | Stroke Cure | $T_{50}$ |
|---|---|---|---|
| 18 | ethylene diamine: 3MSA | 7/10 | 36 |
| 19 | Example 2 | 8/11 | 44 |
| 20 | Example 5 | 8/10 | 42 |
| 21 | Example 4 | 10/14 | 47 |
| 22 | Example 8 | 8/12 | 54 |
| 23 | Example 13 | 11/14 | 46 |
| 24 | Example 11 | 9/13 | 46 |
| 25 | Example 12 | 10/12 | 53 |
| 26 | Example 10 | 10/12 | 46 |
| 27 | Example 3 | 10/12 | 41 |
| 28 | Example 7 | 17/19 | 48 |
| 29 | Example 6 | 29/31 | 50 |
| 30 | ethylene diamine: 2TSA | 9/11 | 37 |
| 31 | Example 16 | 8/9 | 28 |
| 32 | Example 14 | 8/10 | 29 |
| 33 | Control 1 | 8/11 | 20 |
| 34 | Control 2 | 14/16 | 103 |
| 35 | Control 3 | 4/6 | 8.5 |

Control 1 = 2.72 g MSA in 7.3 g water.
Control 2 = 1.86 g MSA in 8.1 g water.
Control 3 = 3.72 g MSA in 6.3 g water.

TABLE 4

| Grams of MSA/ 50 Grams of Resin (GP 5111) | Stroke Cure Time (sec.) | Pot Life (minutes) |
|---|---|---|
| 2.60 | 6 | 8.5 |
| 2.10 | 10 | 17.0 |
| 1.90 | 11 | 20.0 |
| 1.80 | 12 | 27.0 |
| 1.70 | 13 | 37.0 |
| 1.55 | 14 | 50.0 |
| 1.30 | 16 | 103.0 |

TABLE 5

| Example | Stroke Cure Time (sec) | $T_{50}$ Latent Cat. + Acid / $T_{50}$ Acid |
|---|---|---|
| 18 | 10 | 2.12 |
| 19 | 11 | 2.20 |
| 20 | 10 | 2.47 |
| 21 | 14 | 0.94 |
| 22 | 12 | 2.00 |
| 23 | 14 | 0.92 |

TABLE 5-continued

| Example | Stroke Cure Time (sec) | $\dfrac{T_{50} \text{ Latent Cat.} + \text{Acid}}{T_{50} \text{ Acid}}$ |
|---|---|---|
| 24 | 13 | 1.24 |
| 25 | 12 | 1.96 |
| 26 | 12 | 1.70 |
| 27 | 12 | 1.52 |
| 28 | 19 | 50/very large |
| 29 | 29 | 50/very large |
| 30 | 11 | 1.85 |
| 32 | 10 | 1.71 |

EXAMPLE 36

The latent catalyst system formed by the reaction of two moles of methane sulfonic acid (MSA) with one mole of ethylene diamine (EDA) (2:1 latent catalyst) can be augmented with the addition of free strong acid to yield a phenolic resole resin which cures at a short stroke cure while extending the pot life over resins cured with only a strong acid catalyst. In preparing FIG. 1, two resin samples were prepared, one sample containing no latent catalyst (Curve A) and the other containing 5 pph of the 2:1 acid:diamine latent catalyst (Curve B). Stroke cure rates for each sample were determined as additional strong acid was added to generate the plots (Curves A and B) shown. For example, a series of gel time experiments at various levels of strong acid [60 wt. % toluene and xylene sulfonic acids in ethylene glycol (TXEG)], were conducted using a commercial resin (GP 5047) available from Georgia-Pacific Resins, Inc. The sample containing 5 parts per hundred (pph) of the 2:1 latent catalyst Curve B (FIG. 1) from the aforementioned series had a gel time of about 60 seconds at 90° C. with no additional strong acid; when one pph of strong acid catalyst containing 60% by weight toluene and xylene sulfonic acids in ethylene glycol (TXEG) catalyst was added, the 90° C. gel time dropped to about 25 seconds, wit 2 pph of strong acid it dropped to about 20 seconds. The Curve generated from the comparable resin sample containing no latent catalyst (Curve A, FIG. 1) was displaced to a higher level of TXEG to give a comparable 90° C. gel time. The difference in strong acid which must be added to achieve a given gel time is related to the contribution of the latent catalyst to the overall cure at 90° C.

A horizontal dashed at ~13 seconds gel time is drawn in FIG. 1 between the two curves. Comparable cure times are achieved at 5 pph TXEG for the Curve A system and 2.5 pph TXEG for the Curve B system, but the pot lives of these respective samples are significantly different being 240 minutes for the system of Curve B and 60 minutes for the system of Curve A. This shows that the two systems can have the same cure rate at 90° C., even though there is a significant difference in their room temperature pot lives. These data also indicate that the latent catalyst responds very strongly to heat, generating active acid which augments the cure already initiated by the strong acid.

EXAMPLE 37

A series of resins were produced in which the mole ratio of formaldehyde to phenol was varied over the range of 0.90–1.75. Two types of resins were produced, one resin was cooked using an amine catalyst (Table 6) and a second series using a Group II metal hydroxide catalyst (Table 7). Each resin was tested using the insulated 50 gram catalyzed sample method described earlier. A time-temperature profile was determined for each resin catalyst system and a pot life was determined by analysis of the time-temperature cure profile curve. In the test series, a standard acid catalyst, designated TXEG (60 wt % toluene/xylene sulfonic acids in ethylene glycol) and a latent catalyst made with ethylene diamine and methane sulfonic acid in a 1:4 mole ratio and a 57% water dilution were used. Pot life and stroke cure were noted for each system. Data from these experiments are summarized in Tables 6 and 7. The critical observation is that for any given resin mole ratio, the pot life at a comparable stroke cure is much greater for the latent catalyst system. The latent catalyst thus provides a much longer pot life for a given elevated temperature cure resin system.

TABLE 6

High Ortho Phenolic Resins With Standard and Latent Acid Catalysts (Stroke Cure/Pot Life)

| Resin M/R* | Catalyst (pph) | 90° C. Stroke Cure Time (sec) | Pot Life (min) |
|---|---|---|---|
| .90 | TXEG/10 | 13 | 45 |
| .90 | Latent (4:1)/12 | 14 | 200 |
| 1.15 | TXEG/10 | 10 | 30 |
| 1.15 | Latent (4:1)/12 | 9 | 170 |
| 1.40 | TXEG/10 | 12 | 35 |
| 1.40 | Latent (4:1)/12 | 13 | 120 |
| 1.75 | TXEG/10 | 9 | 55 |
| 1.75 | Latent (4:1)/12 | 9 | 280 |

*M/R = Mole ratio formaldehyde/phenol

TABLE 7

Ortho/Para Phenolic Resins With Standard and Latent Acid Catalysts (Stroke Cure/Pot Life)

| Resin M/R* | Catalyst (pph) | 90° C. Stroke Cure Time (sec) | Pot Life (min) |
|---|---|---|---|
| .90 | TXEG/10 | 34 | 40 |
| .90 | Latent (4:1)/12 | 19 | 300 |
| 1.15 | TXEG/10 | 12 | 32 |
| 1.51 | Latent (4:1)/12 | 12 | 100 |
| 1.40 | TXEG/10 | 14 | 45 |
| 1.40 | Latent (4:1)/12 | 13 | 250 |
| 1.75 | TXEG/10 | 14 | 80 |
| 1.75 | Latent (4:1)/12 | 10 | 600 |

The principles, preferred embodiments and modes of operation of the present invention have been described in the foregoing specification. The invention which is intended to be protected herein, however, is not to be construed as limited to the particular forms disclosed, since they are to be regarded as illustrative rather than restrictive. Variations and changes may be made by those skilled in the art without departing from the spirit of the invention.

We claim:

1. A thermosetting phenolic resole resin composition containing a latent catalyst in an amount adequate to cure said resole resin, upon application of heat, at a rate comparable to a rate of cure obtained with said resin using a conventional strong acid under comparable cure conditions, said latent catalyst comprising a salt of an amine selected from a primary amine, a secondary amine and mixtures thereof and a strong acid.

2. The composition of claim 1 wherein said primary or secondary amine is selected from the group consisting of primary and secondary aliphatic, alicyclic, aromatic and heterocyclic amines.

3. The composition of claim 2 wherein said strong acid is selected from the group consisting of sulfonic acids, organic acids and mineral acids.

4. The composition of claim 3 wherein said sulfonic acid is selected from toluene sulfonic acid, xylene sulfonic acid, phenol sulfonic acid, methane sulfonic acid and mixtures thereof.

5. The composition of claim 1 wherein said strong acid has a pKa measured in an aqueous environment of less than about 4.0.

6. The composition of claim 2 wherein said primary and secondary aliphatic amines include methyl amine, ethyl amine, propyl amine, butyl amine, dimethyl amine and diethyl amine, 1,3-diaminopropane, 1,2-diaminopropane and ethanolamine.

7. The composition of claim 2 wherein said primary and secondary aliphatic amines include ethylene diamine, butylene diamine, and diethylene triamine.

8. The composition of claim 2 wherein said primary and secondary alicyclic amines include 1,2-diaminocyclohexane and cyclohexylamine.

9. The composition of claim 2 wherein said primary and secondary heterocyclic amines include piperidine, pyrrole, pyrolidine and piperazine.

10. The composition of claim 1 wherein said primary and secondary amine contains at least one primary amine (—NH$_2$) group.

11. The composition of claim 10 containing the latent catalyst in an amount of between about 1 and 25% by weight of phenolic resole resin solids.

12. The composition of claim 11 wherein said amount is between about and 2-20% by weight.

13. The composition of claim 10 wherein the strong acid in a sulfonic acid.

14. The composition of claim 2 wherein the strong acid is selected from the group consisting of oxalic acid, maleic acid, chloroacetic acid and trifluroacetic acid.

15. The composition of claim 10 wherein the primary amine has the formula R—NH$_2$ wherein R is any radical that does not interfere with the formation of the amine salt or the subsequent use of the salt as a latent catalyst.

16. The composition of claim 15 wherein R is a hydrocarbon moiety.

17. The composition of claim 16 wherein the hydrocarbon moiety is selected from linear or branched alkyl groups of 1 to 8 carbon atoms, alkenyl groups of 2 to 8 carbon atoms, alkynyl groups of 2 to 6 carbon atoms, cycloalkyl and cycloalkenyl groups of 4 to 8 carbon atoms, aryl groups, aralkyl and aralkenyl groups of 7 to 16 carbon atoms, and alkenaryl and alkaryl groups of 7 to 16 carbon atoms.

18. The composition of claim 17 wherein the R substituent may include additional primary (—NH$_2$), secondary (—NH—) or tertiary $$(-\underset{|}{N}-)$$

amino moiety.

19. The composition of claim 2 wherein the secondary amine has the formula R—NH—R wherein each R can be the same of different and is any radical that does not interfere with the formation of the amine salt or the subsequent use of the salt as a latent catalyst.

20. The composition of claim 19 wherein R is a hydrocarbon moiety.

21. The composition of claim 20 wherein the hydrocarbon moiety is selected from linear or branched alkyl groups of 1 to 8 carbon atoms, alkenyl groups of 2 to 8 carbon atoms, alkynyl groups of 2 to 6 carbon atoms, cycloalkyl and cycloalkenyl groups of 4 to 8 carbon atoms, aryl groups, aralkyl and aralkenyl groups of 7 to 16 carbon atoms, and alkenaryl and alkaryl groups of 7 to 16 carbon atoms.

22. The composition of claim 21 wherein the R substituent may include additional primary (—NH$_2$) or secondary (—NH—) amino moiety.

23. The composition of claim 19 wherein the two R substituents are linked together to form a saturated or unsaturated ring containing 5 to 9 atoms.

24. The composition of claim 23 wherein the ring contains up to 3 nitrogen atoms and up to 6 carbon atoms.

25. The composition of claim 15 wherein R is selected from methyl, ethyl, n-propyl, isopropyl, n-butyl, isobutyl, t-butyl, n-pentyl, isopentyl, n-hexyl, n-octyl, phenyl, and benzyl.

26. The composition of claim 19 wherein R is selected from methyl, ethyl, n-propyl, isopropyl, n-butyl, isobutyl, t-butyl, n-pentyl, isopentyl, n-hexyl, n-octyl, phenyl, and benzyl.

27. The composition of claim 2 wherein the amine is selected from N-alkyl amines, N-alkylene diamines, N,N-dialkylene triamines, N,N-dialkyl amines, N,N-dialkenyl amines, N-alkyl diamines, N-alkanolamines, N-alicyclic amines, N-aryl amines, N,N-aryl amines and heterocyclic amines.

28. The composition of claim 27 wherein the amine is selected methyl amine, ethyl amine, propyl amine, butyl amine, ethylene diamine, propylene diamine, butylene diamine, diethylene triamine, N,N-dimethyl amine, N,N-diethyl amine, N,N-diethyleneamine, 1,3-diaminopropane, 1,2-diaminopropane, ethanolamine, 1,2-diaminocyclohexane, N-cyclohexylamine, aniline, N-methylaniline, N-benzyl amine, melamine, pyrrole, pyrolidine and piperidine.

29. The composition of claim 1 containing free strong acid.

30. The composition of claim 1 wherein said latent catalyst is prepared by reacting at least one mole of said strong acid per each mole of amine moiety of the primary and/or secondary amine.

31. The composition of claim 1 wherein the phenolic resole resin is prepared at a formaldehyde to phenol mole ration between about 1:1 to 2:1.

32. The composition of claim 1 wherein the phenolic resole resin has a pH between about 4.5 and 7 before addition of said latent catalyst.

33. The composition of claim 1 containing a non-aqueous solvent.

34. A process for curing a thermosetting phenolic resole resin composition comprising heating said resin in the presence of a latent catalyst in an amount adequate to cure said resole resin, upon application of heat, at a rate comparable to a rate of cure obtained with said resin using a conventional strong acid under comparable cure conditions, said latent catalyst comprising a salt of a primary, a secondary amine and mixtures thereof, and a strong acid.

* * * * *